US006039208A

United States Patent [19]

Lambelet, Jr.

[11] Patent Number: 6,039,208

[45] Date of Patent: *Mar. 21, 2000

[54] VARIABLE DAY START TABLET DISPENSER

[75] Inventor: Lawrence E. Lambelet, Jr., Flemington, N.J.

[73] Assignee: Ortho Pharmaceutical Corporation, Raritan, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/039,945

[22] Filed: Mar. 16, 1998

Related U.S. Application Data

[63] Continuation-in-part of application No. 08/668,593, Jun. 19, 1996, Pat. No. 5,799,821, which is a continuation of application No. 08/282,950, Jul. 29, 1994, Pat. No. 5,562,231.

[51] Int. Cl.[7] .......... G06F 11/66

[52] U.S. Cl. .......... 221/25; 221/75; 221/86; 221/197

[58] Field of Search .......... 221/5, 197, 86, 221/75, 25, 76, 82, 83

[56] References Cited

U.S. PATENT DOCUMENTS

| | | | |
|---|---|---|---|
| 3,199,489 | 8/1965 | Ruoss et al. | 206/531 |
| 3,297,198 | 1/1967 | Wright et al. | 221/5 |
| 3,333,222 | 7/1967 | Pilot et al. | 221/82 |
| 3,348,731 | 10/1967 | Eicholtz et al. | 221/5 |
| 3,410,450 | 11/1968 | Fortencerry | 221/25 |
| 3,437,236 | 4/1969 | Huck | 221/86 |
| 3,557,747 | 1/1971 | Rigney | 221/86 |
| 3,558,003 | 1/1971 | Jones | 221/82 |
| 3,572,282 | 3/1971 | Tump et al. | 206/533 |
| 3,651,927 | 3/1972 | Richardson et al. | 221/5 |
| 3,904,075 | 9/1975 | Richardson et al. | 221/86 |
| 4,165,709 | 8/1979 | Studer | 221/86 |
| 4,555,004 | 11/1985 | Pearo | 221/82 |
| 4,667,845 | 5/1987 | Frazier et al. | 221/25 |
| 4,915,256 | 4/1990 | Tump | 221/5 |
| 5,409,122 | 4/1995 | Kooijmans et al. | 221/86 |
| 5,464,118 | 11/1995 | Grau et al. | 221/5 |
| 5,562,231 | 10/1996 | Lambelet et al. | 221/5 |
| 5,630,525 | 5/1997 | Christoffersen et al. | 221/5 |

FOREIGN PATENT DOCUMENTS

| | | |
|---|---|---|
| 2-200582 | 12/1987 | Japan . |

*Primary Examiner*—Christopher P. Ellis
*Assistant Examiner*—Khoi H. Tran
*Attorney, Agent, or Firm*—Paul Coletti

[57] ABSTRACT

This invention relates to a substantially circular tablet dispenser component system which may be adapted for a variable day start of a prescribed periodic tablet regimen. Also provided are a tablet dispenser kit, a tablet package adapted for filling the tablet dispenser system, methods of filling the tablet dispenser of the invention and methods of administering a prescribed regimen of medication using the tablet dispenser system of the invention, with both "any day start" (i.e., start of the therapy on any day of the week) and "any therapy package" (i.e., not only contraceptives).

8 Claims, 14 Drawing Sheets

VARIABLE DAY START TABLET DISPENSER

This invention is a continuation-in-part of Ser. No. 08/668,593, filed Jun. 19, 1996, now U.S. Pat. No. 5,799,821, which is a continuation of Ser. No. 08/282,950, filed Jul. 29, 1994 now U.S. Pat. No. 5,562,231.

FIELD OF THE INVENTION

This invention relates to a substantially circular tablet dispenser component system which may be adapted for a variable day start of a prescribed periodic tablet regimen. Also provided are a tablet dispenser kit, a tablet package adopted for filling the tablet dispenser system, methods of filling the tablet dispenser of the invention and methods of administering a prescribed regimen of medication using the tablet dispenser system of the invention.

BACKGROUND OF THE INVENTION

Medicaments and other pharmaceutical preparations are often prescribed for patients on a time related or scheduled dispensing basis. Examples of tablets or pills that are prescribed in a set periodic regimen include tablets or pills adapted for oral ingestion that are used for birth control, for regulating blood pressure, for regulating blood lipids, as antibiotics and for treating a variety of other ailments such as diabetes. Such extended time periodic regimens are particularly adaptable to preventative medicine (e.g. regulating blood pressure or birth control) or for treatment of chronic ailments which all require a relatively long course of therapy.

The amount of drug provided in a solid form pharmaceutical preparation such as a tablet or pill is inherently controlled so that each tablet contains a fixed amount of dosage so that there is little or no confusion as to the amount which should be taken. Variability in pharmaceutical administration is often, if not invariably, attributable to patient uncertainty, forgetfulness and/or confusion as to whether or not a tablet has been taken at the prescribed rate and time. This problem can be compounded when the dosage is to be repeated a number of times daily or when multiple medicaments are prescribed or when medicaments are to be taken over a long course of therapy which may extend from weeks to years. This problem may be applicable to most every type of patient including the elderly, the chronically ill (who may be in a weakened state), and the active person engaged in a long term course of treatment such as contraception or hormone replacement therapy.

As a result of problems of confusion, uncertainty or forgetfulness a patient may in reality take more or less than the prescribed rate of dosage that is indicated, thereby, inadvertently altering the prescribed course of treatment. To assure maximum effectiveness of medication prescribed it is desirable to provide a dispenser that will aid the patient in adhering to the prescribed time schedule for dosing whether that be once daily, multiple daily doses or less frequent doses.

Tablet dispensers and devices for dispensing solid form pharmaceutical preparations such as tablets or pills over a time related sequence are known. Examples of such a tablet dispenser is disclosed in U.S. Pat. No. 4,165,709 which provides for a dispenser which allows a user to take a tablet on a prescribed basis, e.g. a daily basis, by providing an indicator that denotes the days of the week. The disclosure of this patent is hereby incorporated herein by reference. No provision is available in this device for enabling one to preset a specific day of the week in which the first designated pill in a differing series of pills is to be taken in a fashion that is simple and efficient. For example, if an indicator mechanism is not adjustable and is preset to require that the first pill of a regimen made up of different pills is to be taken on a particular day of the week, such as Sunday, and a user is prescribed the medication on a Monday, the user will be at risk for a period of time from Monday to the following Sunday. Producing seven different dispensers that will cover the start of each day of the week is a possible, albeit an impractical, solution to this problem.

Other patents such as U.S. Pat. Nos. 4,915,256, 4,646,936 and 4,667,845 describe various pill dispensers which provide for a daily indicator which may designate the period when particular pills are to be taken and can be preset to start the regimen on any day selected by the user. While such pill dispensers accomplish a desirable end of providing for any day start of a prescribed regimen with means for pills to be dispensed on a given day, such are not entirely practical for various reasons. These devices may be either complicated to use or difficult to refill. For example, a counter clockwise rotation of a circular pill dispenser may be difficult to understand and unnatural for a user; a design requiring multiple steps which may be erroneously taken out of sequence could lead to patient confusion or frustration and/or a noncompliance package, whereby a designated initial pill is not provided in the desired initial position in the dispenser.

It is therefore an object of the present invention to provide a unique design for dispensing tablets which is simple and intuitive to use, readily refillable by the patient/consumer and relatively foolproof, i.e. assures compliance and avoids inadvertent mistakes. Further, the present invention is intended to provide a dispensing system which can provide a prescribed regimen of pills in a consistent manner with a high degree of confidence while also providing an any day start feature. Additional objects and advantages of the invention will be set forth, in part in the description which follows and in part will be obvious from the description, or may be learned by practice of the invention. The objects and advantages of the invention are realized and obtained by means of the devices, combinations, and methods particularly pointed out in the appended claims.

SUMMARY OF THE INVENTION

To achieve the objects and purposes of the invention, as embodied and fully described herein, the present invention provides a tablet dispenser component system comprising as a first component a rotatable substantially circular unidirectional knob having indicators of periodicity thereon. The rotatable knob is encircled with a notched skirt comprising a plurality of notches spaced substantially equally apart.

A second component comprises a substantially flat support having a single tablet dispensing aperture and a rising wall portion protruding therefrom to form an interior cup portion. A third component comprises a center axis means which is engaged and fixed onto the flat support. A first engagement means is provided whereby the rotatable knob is rotatably joined to the flat support. A second engagement means is provided comprising unidirectional ratchet means to form a functional system with the rotatable knob for unidirectional rotating the rotatable knob in a circular fashion about the center axis means.

The rotatable knob and either the flat support or central axis means have unidirectional ratchet means comprising a plurality of ratchet stops corresponding to a single space or notch on the notched skirt. In preferred embodiments the ratchet means comprises a ratchet track and spring pawls for positive engagement into the track to provide for each ratchet stop. The track and pawls may be located on the rotatable knob and fixed center axis or flat support. For example, the track may be located on the rotatable knob and the spring pawls located below the rotatable knob on the flat support or the track may be located on the center axis means and the spring pawls located on the rotatable knob.

The fourth component of the system comprises a separate and removable tablet package adapted to fit over the rotatable knob with means to positively engage the notched skirt such that the two components rotate in unison. The tablet package comprises a plurality of collapsible tablet pockets each containing a tablet arranged substantially circularly about the package. The spacing of the tablet pockets corresponds to each stop of the ratchet means whereby a new tablet is placed over the tablet dispensing aperture upon the positive engagement of each stop on the ratcheted rotatable knob. The tablet pockets are lidded with a frangible membrane which is interposed between the pockets and the single tablet dispensing aperture of the support. A tablet is dispensed from the package by collapsing the pocket which is in registry with the aperture thereby urging the tablet to fracture the membrane and pass through the aperture. The collapsible tablet pockets are formed to accommodate tablets of substantially circular, non-circular or caplet-like shape. In preferred embodiments the tablet package is fixed to a substantially rigid or stiff platform piece comprising a plurality of tablet apertures which correspond to the tablet pockets and one or more, preferably two, sprocket lugs on the interior thereof to positively fit in and engage the notched skirt.

In preferred embodiments of the tablet dispenser of the invention the substantially flat support and interior cup portion, formed by wall portions rising from the flat support base is provided with means for retaining the tablet package and for interlocking the tablet package in place upon engagement of a first stop of the unidirectional ratcheted and rotatable knob. The tablet package is removable from the support means upon completion of a full rotation of the ratcheted and rotatable knob. In a particularly preferred embodiment, the rotatable knob comprises a dated ring which is unidirectionally rotatable about the fixed center axis in a clockwise direction wherein the notched skirt is attached to the rotatable ring portion thereof. The fixed center axis preferably has an indicator mark thereon aligned with the single tablet dispensing aperture of the flat support component.

In other preferred embodiments of the invention the tablet package has at least two complementary projections to positively engage at least two notches in the notched skirt when fitted over the rotatable knob. In preferred embodiments, the collapsible tablet pockets are formed to accommodate tablets of substantially circular, non-circular or caplet-like shape.

In a particularly preferred embodiment of the invention the substantially flat support is adapted with means for receiving, orienting and interlocking the tablet package by the provision of at least two, preferably three, inward extending ledges protruding from the rising wall portion therefrom. The shape and orientation of the ledges correspond to at least two, preferably three, complementary recesses on the tablet package, thus permitting reception of the tablet package onto the flat support in a single initial position of tablet orientation about the flat support. A designated tablet is positioned above the tablet dispensing aperture at the initial tablet position and the tablet package is interlocked onto the base upon dispensing of the initial tablet followed by a single advance of the dated rotatable knob whereby the tablet package underlaps the ledges and is held in place thereby. The tablet package is therefore not disengaged or removable until a complete rotation of the knob returns the tablet package to the initial tablet position.

In particularly preferred embodiments the inward extending ledges are spatially arrayed, preferably asymmetrically, to inhibit the receipt of the package on the substantially flat support and the disengagement, discharge or removal of the tablet package from the substantially flat support at any position other than the initial tablet position. Further, the inward extending ledges are preferably, arrayed, shaped or sized to receive or disengage with the complementary notched tablet package only at the initial tablet position.

In preferred embodiments of the system of the invention the rotatable knob is marked with at least one set of the seven days of the week whereby each of the markings is oriented to a single tablet position in the tablet package corresponding to an indicated day of the week when engaged in the flat support portion. A single tablet corresponding to an indicated day of the week is fed over the single tablet dispensing aperture of the flat support portion upon each advance of the positively engaging stop of the dated rotatable knob to the subsequent day of the week. The dated rotatable knob is preferably provided with days of the week in at least three sets of seven images on the rotatable knob. Any setting of the dated knob in relation to the indicator mark(s), thus, may constitute a predisposed start day setting for the package.

In preferred embodiments the tablet dispenser system comprises a lid or cover portion which fits over the support base to provide an enclosed compact package. Preferably, the lid and support include interlocking means for engaging the compact package in a closed position when not is use.

In other embodiments the invention is provided with medicament or a tablet dispenser kit for the administration of a particular medicinal regimen comprising a tablet dispenser which is filled with the prescribed medicament in a preset prescribed orientation which complies with the periodic regimen of administration indicated. In particularly preferred embodiments, the medicament is an oral contraceptive or hormone replacement therapy medicament provided in a prescribed regimen. In another kit embodiment, the tablet package is presented as a separate component from the dispensing container thereby calling attention to the refill features of the system.

The present invention also provides for a method of administering a prescribed regimen of tablet medication comprising utilizing a tablet dispenser system of the invention whereby the tablets deployed therein and the orientation of the days of the week to each tablet position is adapted to a prescribed regimen. Preferably, the prescribed regimen is for providing oral contraceptive or hormone replacement therapy.

The present invention also provides for a tablet package adapted for receipt and use in the tablet dispenser system of the invention which may be provided for refilling the tablet dispenser system.

Further, a method of filling or refilling the tablet dispenser system of the invention is provided which comprises the step of aligning at least two complementary recesses on the tablet package with at least two inward extending ledges protruding from the rising wall portion of the substantially flat support of the tablet dispenser; and placing a tablet package onto the substantially flat support.

In other embodiments a method of filling the tablet dispenser system of the invention is provided comprising the steps of rotating the rotatable knob marked with the days of the week to align the desired start day of the week with the initial tablet position; aligning at least two complimentary recesses on the tablet package with at least two inward extending ledges protruding from the rising wall portion of the substantially flat support; and placing the tablet package onto the substantially flat support.

In other embodiments, subsequent steps are provided for dispensing the initial tablet located at the initial tablet position and rotating the rotatable knob one stop to the next day to positively engage the tablet package in the tablet dispenser thereby inhibiting disengagement of the package until a full rotation of the rotatable knob has been completed. In another embodiment, the tablet package is anchored in the load position by a movable holding lug on the flat support of the tablet dispenser system.

In yet another embodiment, the tablet housing is bonded to the stiff platform by a plurality of posts attached to the platform, threaded through holes in the housing, and headed over in rivet fashion. The platform is designed to come apart upon removal of the tablet housing rendering it nonfunctional for reuse and separable for recycling.

In another embodiment of the invention a tablet dispenser component system is provided comprising:

- a circular tablet package comprising a plurality of sequentially arranged collapsible tablet pockets each containing a tablet arranged substantially circularly about the package wherein the tablet package comprises at least two asymmetrically spaced notches about the outer periphery of the ringed circular package;
- a base support comprising a single tablet dispenser aperture therein and at least two ledges which are shaped, sized, and oriented to receive the tablet package in only one position of positive engagement thereon whereby a designated tablet of the tablet package is provided over the single tablet dispensing aperture;
- a means for rotating the circular tablet package about the base support around a center axis portion situated on the base support to orient tablets in the sequentially arranged tablet pockets of the tablet package over the tablet dispensing aperture; and
- a means for positively engaging the tablet package onto the base support upon the initial dispensing of a tablet from the tablet package and rotation of the tablet package to move the next sequentially arranged tablet pocket over the tablet dispensing aperture.

In another embodiment of the invention a tablet dispenser system for dispensing a regimen of tablets in a designated sequence is provided comprising:

- as a first element, a flat support having a single tablet dispensing aperture therein and an encircling wall portion erected thereto defining a cup-like interior;
- as a second element, a pivot connected to the center of the flat support defining an axis;
- as a third element, a rotatable knob having a top surface with indicators of periodicity marked thereon in correspondence with the tablets, a means for gripping thereby to apply rotary force, and a central bore sized for encircling the pivot;
- as a fourth element, a first connecting means for rotatably connecting the rotatable knob coaxial to the flat support;
- as a fifth element, a means for intermittent unidirectional advancement of the knob about the axis with registry corresponding to the aperture and the indicators of periodicity;

- as a sixth element, a circular tablet package comprising a housing containing the tablets in a plurality of frangible lidded collapsible tablet pockets arranged circularly about the package at a radial distance corresponding to the distance of the aperture from the axis and having a central bore sized for encircling the rotatable knob;
- as a seventh element, a means for orienting the tablet package to the flat support, whereby the first tablet is located over the aperture and disorientation of the tablet package to the flat support is inhibited; and
- as an eight element, a second connecting means for connecting the tablet package to the rotatable knob upon loading onto the flat support for any initial setting of the knob such that rotary force applied to the knob is translated to the tablet package providing the manner in which the tablet package is advanced thereby causing each tablet of the regimen to be presented in the designated order, accompanied with the corresponding indicator of periodicity and registered by the intermittent unidirectional advancement means, to the aperture for the purpose of dispensing a single tablet at a time from the tablet dispenser by collapsing the collapsible tablet pocket positioned thereto and urging the tablet through the frangible lid into and through the aperture.

The invention also provides a tablet package adapted for placement into the tablet dispenser system of the invention. In preferred embodiments the tablet package comprises a hole in its center and notches in its outer periphery which are shaped, sized or oriented to be placed upon a base support for the tablet package which support comprises a center knob and protruding ledges which are complementary to the hole and notches of the tablet package, respectively. Whereby, the tablet package is received onto the base support in only a single desired orientation providing a designated tablet of the tablet package over a single tablet dispensing aperture in the base support of the tablet dispenser system.

The invention also provides an intuitive tablet dispenser component kit for dispensing a regimen of solid dosage preparations in a designated sequence, comprising:

- as a first element, a container;
- as a second element, a refill carrier housing the solid dosage preparations in a circular array loaded into the container, the refill carrier presented separately upon introduction to emphasize a refillable feature;
- as a third element, a means for individually dispensing the solid dosage preparations from the refill carrier; and
- as a fourth element, a set of timing indicators, appropriate for the course of therapy and in correspondence with the solid dosage preparations in count and layout, affixed to, and in registry with, the refill carrier.

Dialpak® tablet dispensers (Ortho Pharmaceutical Corporation, Raritan, N.J.) are the commonly available contraceptive dosage dispensers useful for a regimen of tablets to be taken in a specific sequence. A compliance feature provides for the tablets, which are arrayed circularly, to be rotated one-at-a-time to an aperture through which a selected tablet can be expelled from the package. Days-of-the-week are provided as indicia to guide the user to the appropriate tablet for the current day. This system also reminds the user whether a tablet has been taken on the current day. Since there in only one aperture, only one tablet can be selected at a time.

A modification to this dispensing system permits the user to select a start day for the regimen before loading the dispenser. The tablets are contained in a refill unit supplied separately from the dispenser. A mechanism is provided whereby the refill can be loaded in only one orientation relative to the operating position regardless of the selected start day. In this manner the first tablet of the sequence is located over the dispensing aperture and aligned with the start day. Each advance of the system rotates a sequential tablet and a sequential day indicia into registration with the aperture. Importantly, the system is now configured by the present invention to be useful not only for an "any day (of the week or month) start" configuration, but in addition, for a variable dosage regimen, with the sole requirement that the package insert be compatible with the package base.

DETAILED DESCRIPTION OF THE PREFERRED EMBODIMENTS

Reference will now be made in detail to preferred embodiments of the invention. Examples of two preferred embodiments are illustrated in the accompanying figures and described in detail below with reference to such figures and the numbers provided therein.

Figure 1:
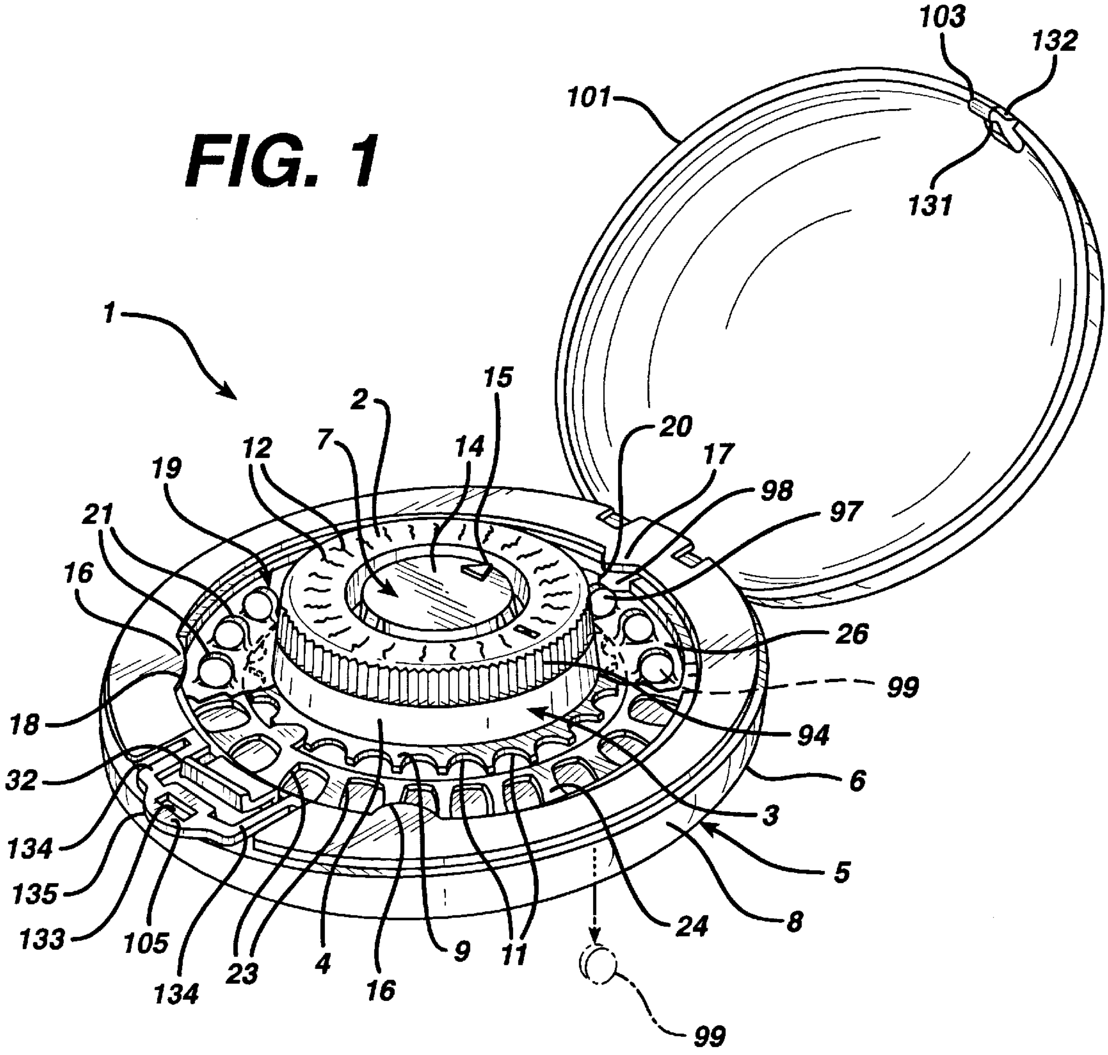
FIG. 1 is a perspective view of a tablet dispenser incorporating the present invention with the notched skirt and tablet platform provided in a cut away view.

Referring now to FIGS. 1–6, a first preferred embodiment of the invention will be described in further detail. FIG. 1 is a perspective view of a tablet dispenser 1 incorporating the tablet dispenser system of the present invention. The tablet dispenser 1 comprises as a first component, a substantially circular unidirectional rotatable knob 3 which is encircled with a notched skirt 9 comprising a plurality of notches 11 spaced substantially equally apart. The rotatable knob 3 comprises a flat surface 2 and a cylindrical wall 4. A portion of the cylindrical wall 4 may be provided with ridges 94 in a knurling pattern for enhancing hand gripping of the rotatable knob 3. The rotatable knob 3 is mounted onto a second component, which is base 5 comprising a substantially flat support 6, having a single tablet dispensing aperture 13, and a rising wall 8 extending from the periphery of the flat support 6.

The rotatable knob 3 is attached to the flat support by engagement means around a third component which is a fixed center axis means 7 about which said rotatable knob 3 may be rotated in a circular fashion. The fixed center axis means 7 has a flat top 14 and includes an optimal pointer shaped indicator 15 which aligns with an angular ledge 17, a current or initial tablet position 97 and a corresponding day of administration 12 imprinted on the flat surface 2 of the rotatable knob 3.

Figure 4:
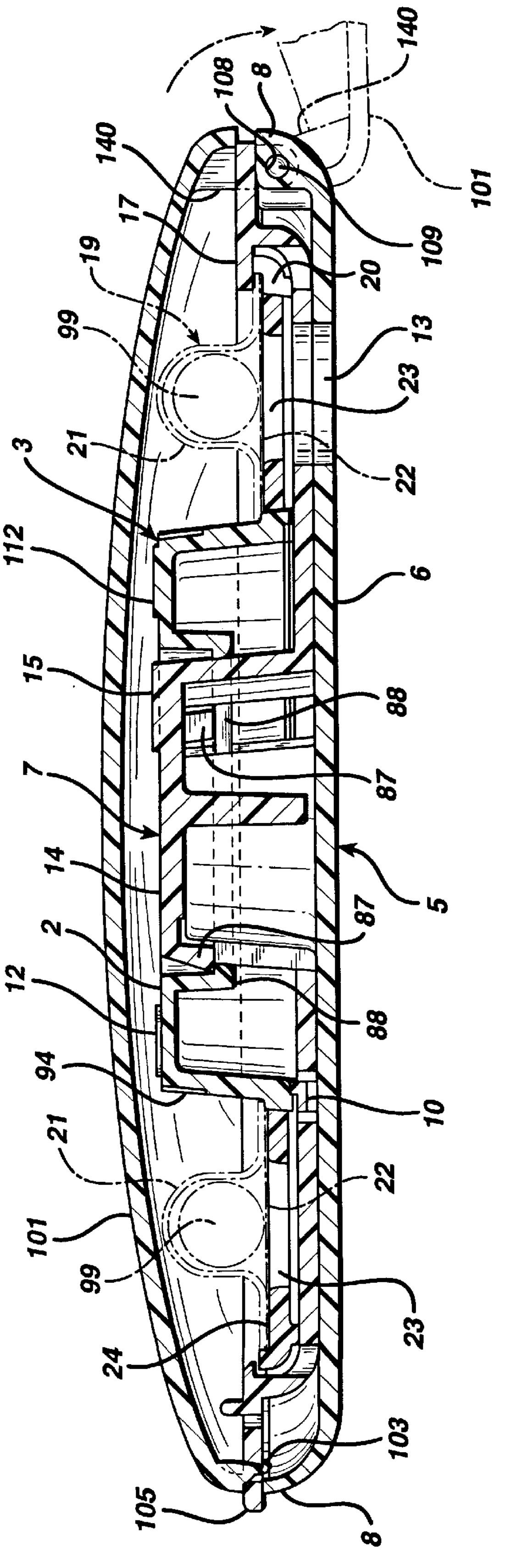
FIG. 4 is a cross-sectional view of FIG. 4 with the tablet dispenser shown in a closed position.

The tablet dispenser shown in FIG. 1 comprises a fourth component which is a separate and removable tablet package 19 which is adapted to fit over the rotatable knob 3 with means to positively engage the notched skirt 9 thereof such that the two components rotate in unison. The separate and removable tablet package 19 comprises a rigid platform 24 and an essentially flexible blister ring 26 upon which tablets 99 are provided in collapsible tablet pockets 21. The tablet package 19 comprises a plurality of collapsible tablet pockets 21 each containing a tablet 99 arranged substantially circularly about the package whereby the spacing of the tablet pockets 21 correspond to each stop of the ratchet means, whereby a new tablet 99 is placed over the tablet dispenser aperture 13 upon the positive engagement of each stop on the ratcheted rotatable knob 3. The tablet pockets 21 are lidded with a frangible membrane 22 (best seen in FIG. 4) which is sealed to the blister ring 26 and interposed between the tablets 99 in the tablet pockets 21 and a single tablet dispensing aperture 13. A substantially rigid or stiff platform 24 comprises a plurality of tablet apertures 23 which are substantially aligned with each tablet pocket 21. A tablet 99 is dispensed from the tablet dispenser 1 by collapsing the tablet pocket 21 which is in registry with the single tablet dispensing aperture 13 thereby forcing the tablet to fracture a frangible membrane 22 and pass through the apertures 23 and 13 (as seen in FIG. 4). The rigid platform 24 and the flexible blister ring 26 are held together by bonding means (e.g. glue, ultrasonic welding or staking).

The base 5 has a rising wall 8 extending from the flat support 6 to form a cup like interior space in which the rotatable knob 3 and tablet package 19 are housed. The base 5 comprises at least two inwardly extending ledges 16 protruding from the rising wall portion 8 toward the center axis means 7. The shape and the orientation of the ledges 16 correspond to at least two complementary recesses 18 on the tablet package 19 permitting reception of the tablet package 19 onto the flat support 6, whereby a designated first tablet 97 is positioned above the tablet dispensing aperture 13 at the initial or current tablet position 98 which is indicated by an angular ledge 17. The angular ledge 17 may be cooperative with ledges 16 by corresponding to complementary recesses 20 and 18 of the tablet package 19 to provide reception of the tablet package 19 onto the flat support 6. The tablet package 19 is interlocked onto the base 5 upon a single advance of the dated rotatable knob 3 whereby a portion of the rigid platform 24 is not coextensive with the inwardly extending ledges 16 and 17. The tablet package is not disengaged or removable until a complete rotation of the knob 3 returns the tablet package 19 to the initial tablet position 98. A finger lever 32 is provided, diametrically opposite the angular ledge 17, as is more fully discussed below in the description of FIG. 3.

The tablet package further comprises a cover 101 which together with the base 5 protects the dispenser contents from impact damage and light degradation particularly where the base and cover material is of such density and opacity as to filter out degraded wavelengths of light and to protect the dispenser's contents from physical damage attendant to normal use. A latch strut 103 extends toward the base 5 from the cover 101. The latch strut 103 comprises an inward hook 131 and an outward lever 132. When the cover 101 is closed onto the base 5, the latch strut 103 passes through a latch seat aperture 133 into a cavity beneath latch seat 105 thereby snapping the inward hook 131 beneath the bottom surface of the latch seat 105 and abutting the outward lever 132 to the top surface of the latch seat. The latch seat 105 is connected to the base 5 by torsion arms 134 such that latch lever 135 overhangs the base. To open the dispenser, the latch lever 135 is urged upward thereby lifting the outward lever 132 while rotating the seat aperture 133 into disengagement from the inward hook 131 resulting in the cover springing ajar.

Figure 2:
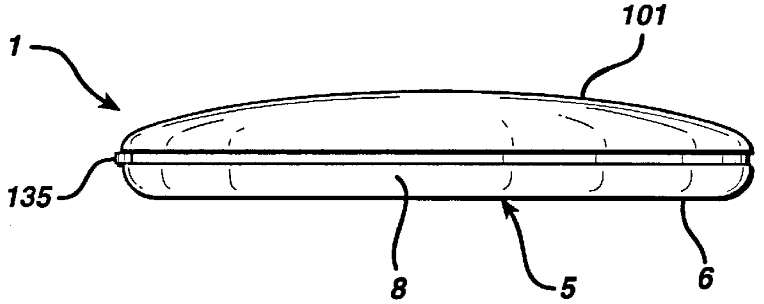
FIG. 2 is a side view of the tablet dispenser in a closed position.

FIG. 2 is a side view of a tablet dispenser 1 in a closed position upon which the cover 101 is closed upon the base 5 over the flat support 6.

Figure 3:
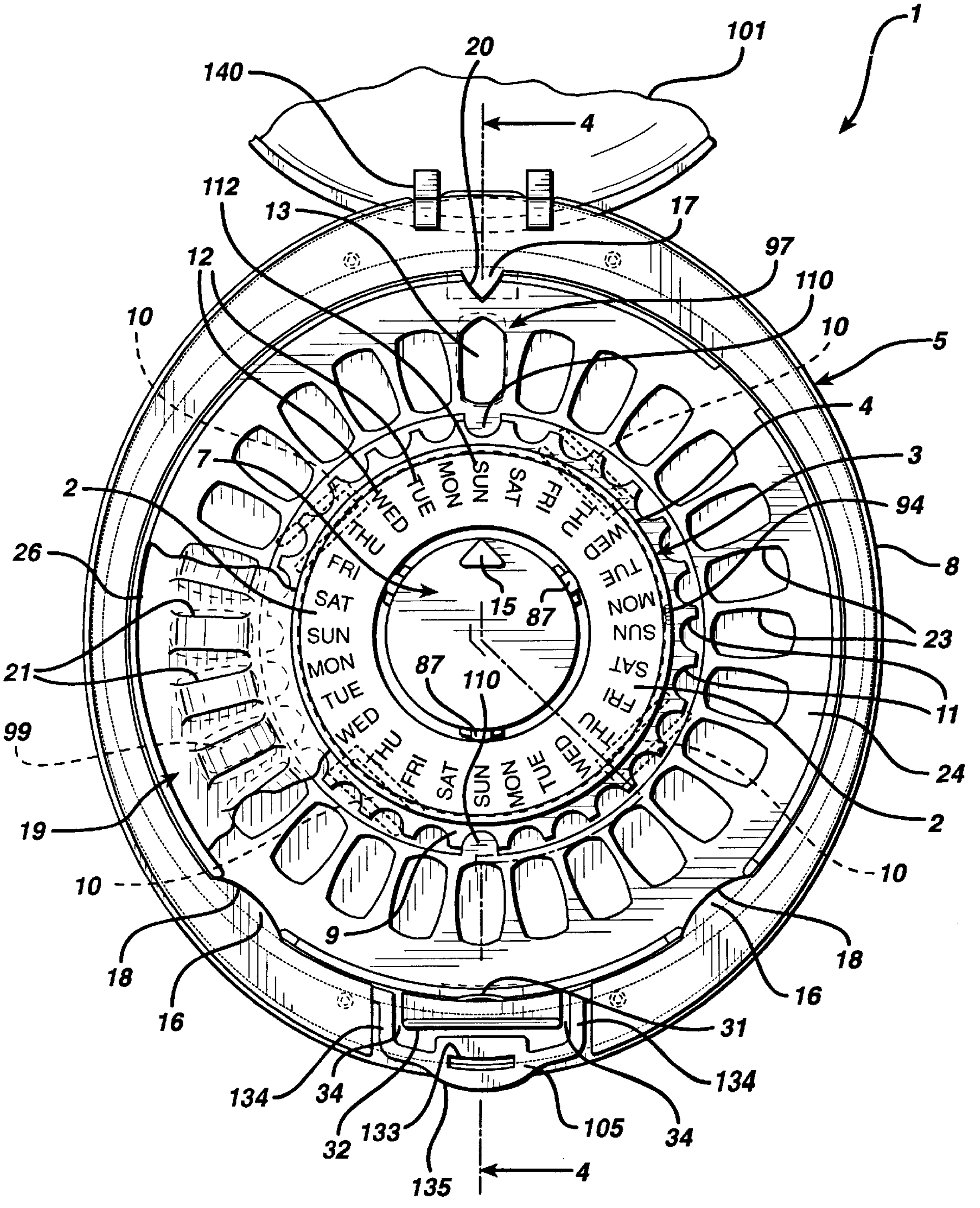
FIG. 3 is a plan view of the cup like support portion of the dispenser with the tablet package provided in a cut away view.

FIG. 3 is a plan view of the cup like support portion of the dispenser base 5 with the blister ring 26 provided in a cut away view showing many of the components described for FIG. 1 above. A notch 20 in the tablet package 19 at the current dispensing tablet position 97 permits the tablet package to be placed over the angular indicating ledge 17. The top of the rotatable knob 3 is marked with the seven days of the week repeated for four weeks or 28 days of administration 12. Ratchet spring pawls 10 are shown by ghost lines on the edges of the rotatable knob 3. An optional day indicator 15 is positioned on top of fixed center axis 7 and points to the current day 12 at the current dispensing pill position 97 and aligns with the angular indicator 17.

The rotatable knob 3 has a notched skirt 9 and a flat top surface 2 connected by a cylindrical wall 4. The flat top surface 2 is imprinted with days of administration 12 of a number corresponding to the number of tablet pockets 21 and in such a way that the days align both with the tablets 99 disposed in the tablet pockets 21 and the ratchet positions (not shown). The tablet pockets 21 and tablets 99 disposed therein are sequenced such that they advance clockwise continuously without interruption. The notched skirt 9 is edged with notches 11 of a number corresponding to the pill positions and similarly aligned with the ratchet system and the tablets 99. Sprocket lugs 110 of the tablet package 19 are shown in engagement with notches 11 of the notched skirt 9. This engagement of sprocket lugs 110 causes the tablet package 19 to interlock and rotate in unison with the notched skirt 9 of the rotatable knob 3.

A holding lug 31 is appended to the rising wall portion 8 of the flat support 6 and overhangs the tablet package 19 when the tablet package is inserted onto the tablet dispenser 1 thereby adding a safety feature for the load position where ledges 16 and recesses 18 are in bypass alignment. The rising wall portion 8 of the flat support 6 is provided with slots 34 to allow articulation of the holding lug 31 when the tablet package 19 is pressed into location. The finger lever 32 is provided to ease the removal of the tablet package.

FIG. 4 is a cut away view taken along line 4—4 of FIG. 3 with a pill package shown in a closed position. A first pair of hinge struts 140 depend from the cover and interleave with a second pair of hinge struts 140 attached to the rising wall portion 8 to form a hinge between the cover and base when pin 109 is threaded into four aligned holes 108 of the two pairs of hinge struts. The cover 101 performs the function, together with base 5, of protecting the dispenser contents from impact damage and light degradation, and each is shaped in a manner to cup roughly one-half of the enclosed volume. The latching means comprising strut 103 and seat 105 are in an engaged and locked position.

Figure 5:
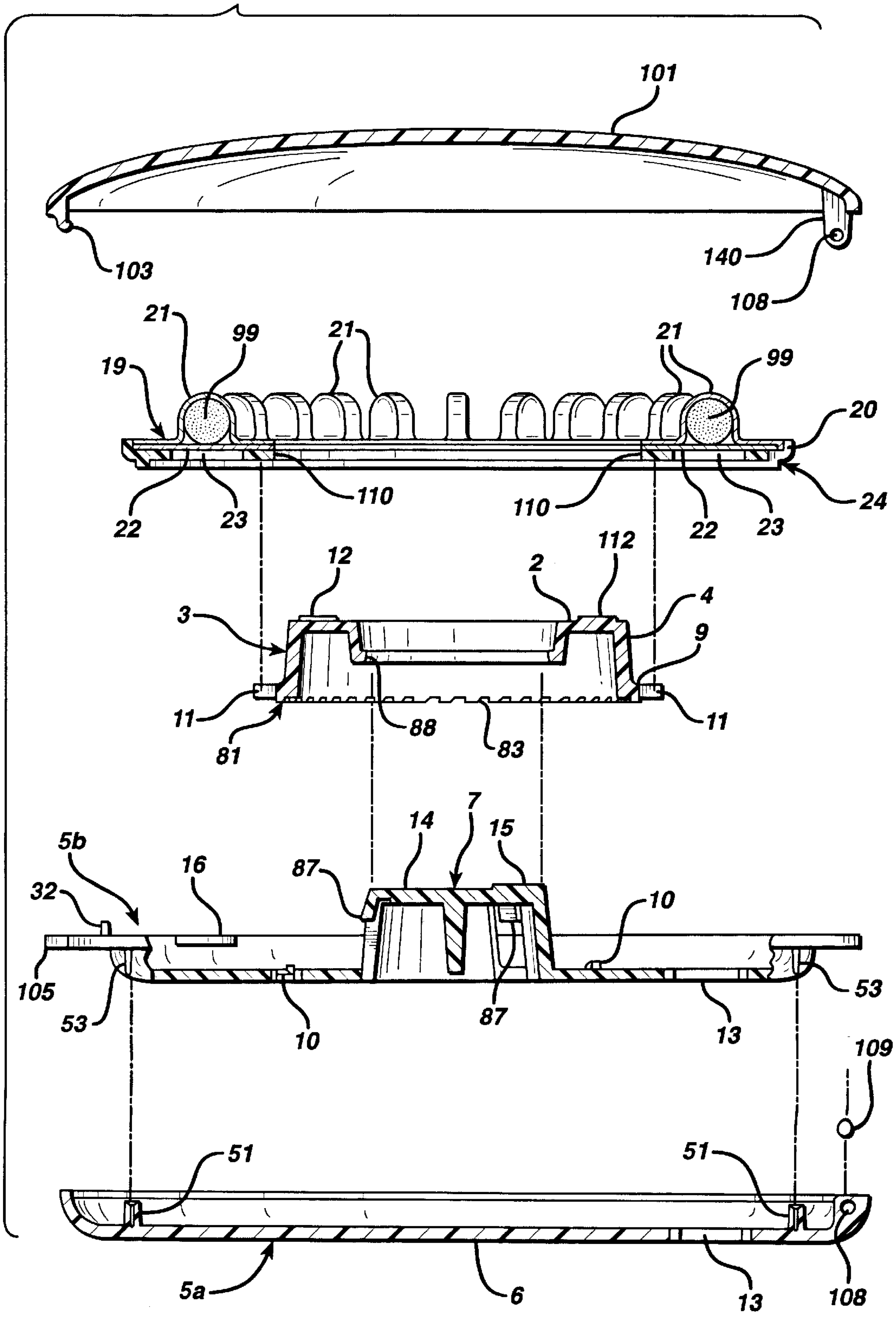
FIG. 5 is an exploded cross-sectional view of FIG. 4 with a tablet dispenser provided as if in a closed position.

FIG. 5 is an exploded cut away view taken along line 4—4 of FIG. 3 with a tablet dispenser provided as if in a closed position. A base insert **5*b*, which includes center axis portion 7, is snap fitted into base unit 5*a* by friction jackets 51 of the base unit 5*a* and friction posts 53 of the base insert unit 5*b*. The interior portions of the notches 11 of the notched skirt 9 engage two or more protruding lugs 110 of the tablet package 19, upon such engagement the tablet package 19 moves as the rotatable knob 3 moves thus rotating the tablet package 19 and the tablets 99 contained therein along their circular pathway around the dispenser and sequentially deploys an individual tablet 99 over the tablet dispensing aperture 13 upon each ratchet stop of the ratcheted rotatable knob 3. The base insert 5*b* also contains ratchet spring-pawls 10 circularly positioned and symmetrically arrayed around the axis of symmetry and tangentially inclining upward from the plane of the floor, rising in a clockwise direction. An elevated structure centered on the axis of symmetry provides a fixed center axis means 7 for rotatably connecting the rotatable knob 3 by three flexible retainer struts 87 which overhang a retaining ledge 88 on the inner diameter of the rotatable knob 3. The retainer struts 87 and ledges 88 allow bypass of the rotatable knob 3** during assembly and thereafter form a rotatable assemblage.

The bottom of the notched skirt 9 contains a circular ratchet track 81 with clockwise tending vertical ramps 83 of a number corresponding to the number of tablet pockets 21, aligned with the days 12, the tablets 99, and the base aperture 13. The clockwise tending vertical ramps 83 ride over, depress and engage the ratchet spring-pawls of the base providing discrete positioning of the tablets 99 over the base aperture 13 and in alignment with sequential days 12 while preventing counterclockwise backoff.

The tablet dispenser of the invention may be operated as follows, referring to FIGS. 1 and 3: To fill the tablet dispenser 1 with the tablet package 19, the user rotates the rotatable knob 3 to align the current or desired start or initial day of the week 112 with angular ledge 17 and pointer shaped indicator 15. The user then places the tablet package 19 onto the base 5 by aligning the complementary recesses 18 of the tablet package 19 with the extending ledges 16 of the base 5 and the angular ledge 17 with the complementary recess 20 and fitting the tablet package 19 over the base 5 and the holding lug 31. The tablet package 19 is pressed over the holding lug 31 and into the base 5 to insert the tablet package 19. The sprocket lugs 110 of the tablet package 19 are thereby oriented for engagement with the notched skirt 9 for rotatable operation. After dispensing the first tablet 99, the user rotates the rotatable knob 3 so that the specific mark 12, indicating the second day on which a tablet is to be taken, is in alignment with pointer 17 (this also aligns the tablet, corresponding with that particular day, in registry with the aperture 13 in flat support 6). When it is time to take the next tablet 99, the user presses down on collapsible pocket 21 thereby urging the tablet 99 to fracture frangible membrane 22 and pass through its corresponding tablet aperture 23 in the platform 24 and then through aperture 13 in the flat support 6 for collection thereafter. The ratchet track 81 in cooperation with the pawls 10, unseen to the user, controls the rotation so that each tablet passes incrementally over and in registration with the aperture. This procedure continues until the supply of tablets is exhausted, whereupon the user merely lifts out the empty tablet package and replaces it with a new tablet package containing a full supply of tablets thus refilling the tablet dispenser.

Referring now to the FIGS. 6–13, a second preferred embodiment of the invention will be described in detail.

Figure 6:
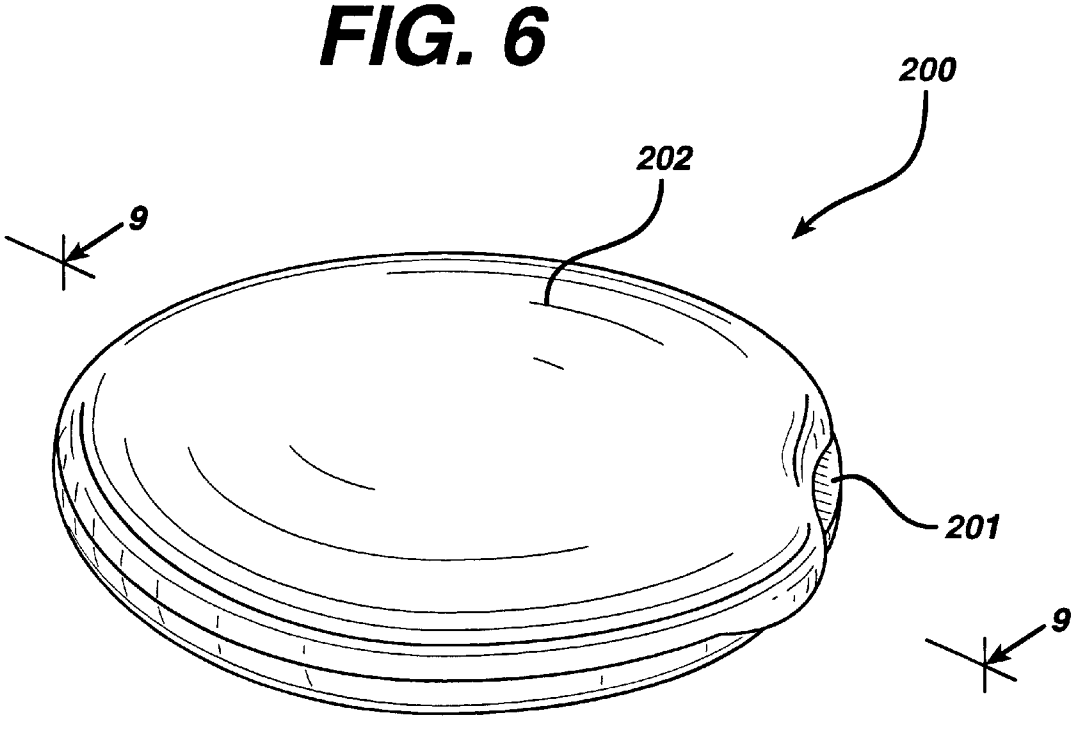
FIG. 6 is a perspective view of a tablet dispenser incorporating the present invention in a closed position.

FIG. 6 shows the table dispenser 200 in a closed position whereby a cover 202 sits atop a flat support 201.

Figure 7:
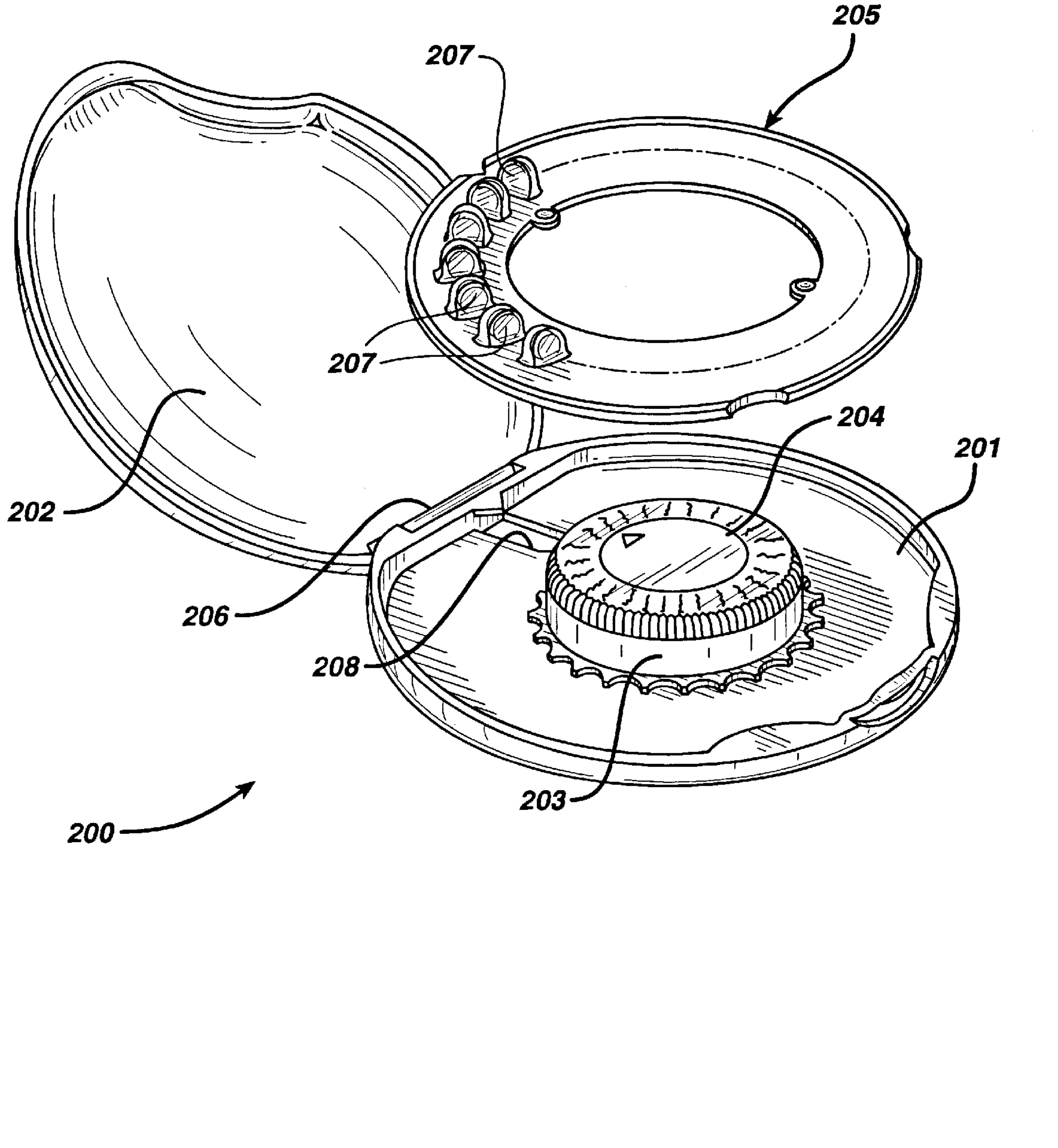
FIG. 7 is a perspective view of the tablet dispenser in an open position with a tablet package (refill unit) positioned for loading.

FIG. 7 shows the tablet dispenser system comprising a tablet dispenser 200 and circular tablet package 205. The tablet dispenser comprises a flat support 201, a cover 202, and a rotatable knob 203 rotatably fixed onto the flat support by pivot 204 thereby providing an axis of rotation for the rotatable knob. The cover and base are connected at hinge 206. The recitation of the hinge structure is similar to that previously described. The circular tablet package 205 contains a regimen or kit of tablets or pills 207 illustrated in a count of 28 (partially shown). Upon loading, the circular tablet package connects to the rotatable knob such that torque applied to the knob rotates each tablet 207 of the circular tablet package in turn over a tablet dispensing aperture 208 located in the flat support 201 thereby providing means for a selected tablet to be expressed from the tablet dispenser.

Figure 8:
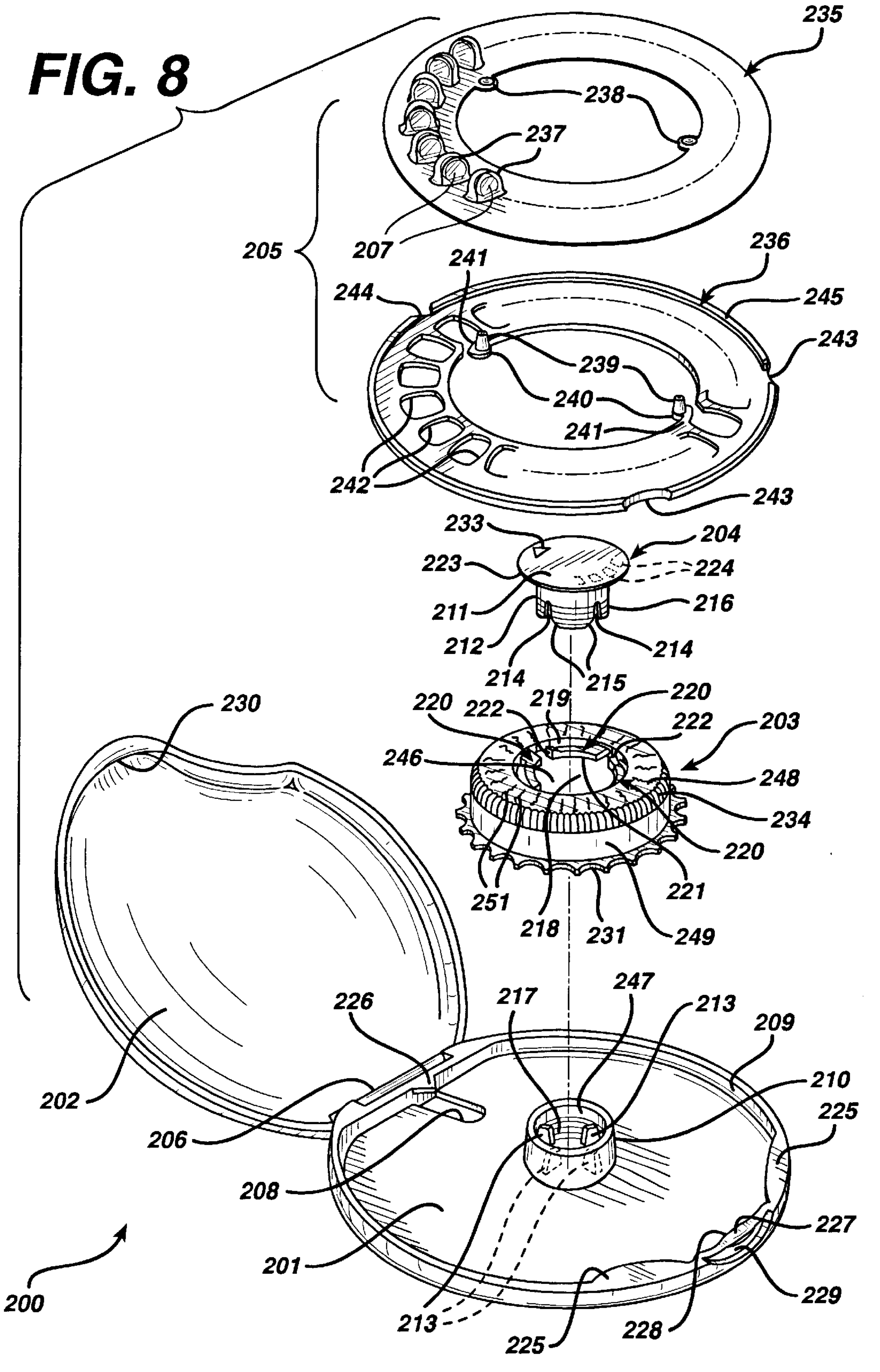
FIG. 8 is an exploded perspective view of the tablet dispenser and tablet package (refill unit)
Figure 9:
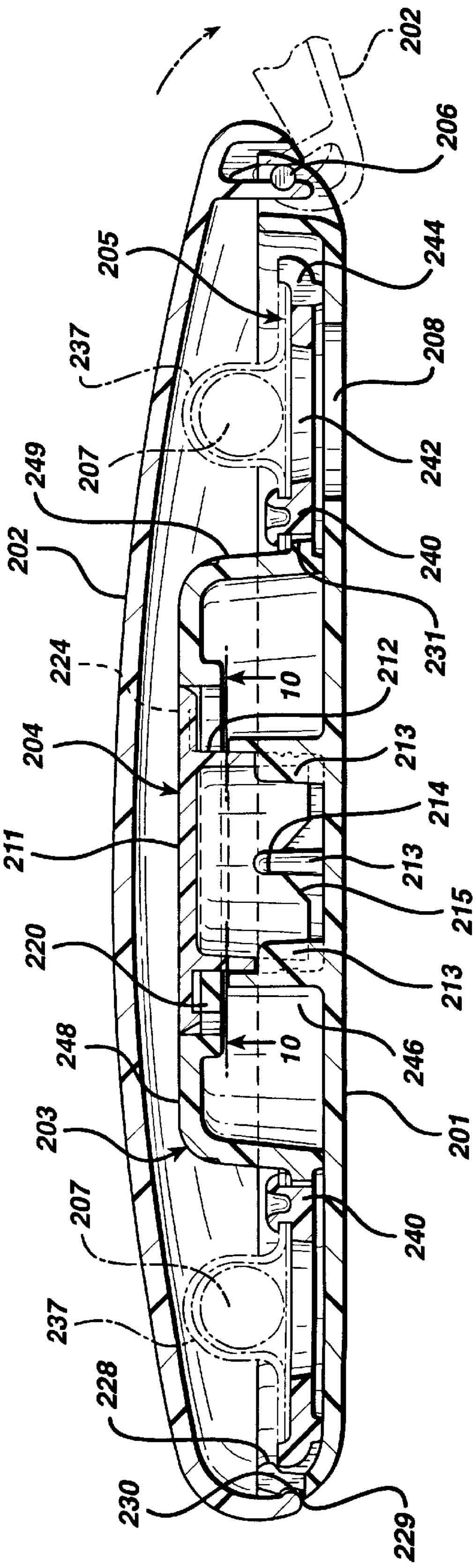
FIG. 9 is a cross-sectional view taken along line 9—9 of FIG. 6 with the tablet dispenser shown in a closed position.
Figure 10:
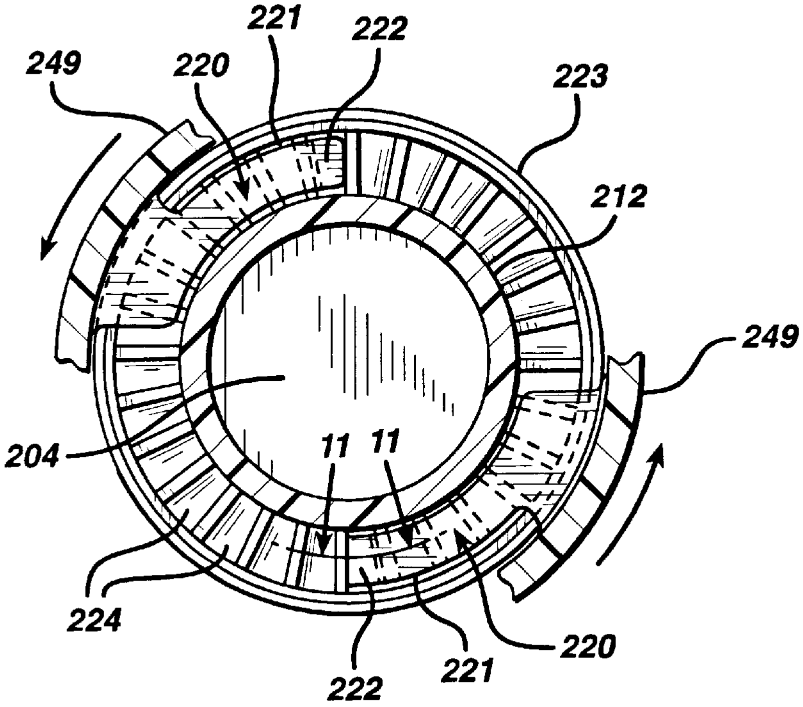
FIGS. 10 and 11 show details of the ratchet mechanism of the tablet dispenser.

In the exploded view of FIG. 8, the flat support 201 is bounded by an encircling wall portion 209 erected thereon. Attached to the flat support at the center is a cylindrical wall portion 210. The pivot 204 comprises a flat surface 211 mounted onto and overlapping a cylindrical stalk 212 which provides a support means. The overlap defines a bottom surface 223, best illustrated in FIG. 10, which forms the base for a circular ratchet track 224. The outside diameter of the stalk 212 is of such dimension as to cause a friction fit with the interior surface 247 of the cylindrical wall portion 210 when assembled thereto. An orientation means for the pivot is provided by four radial vanes 213 extending inward from the cylindrical wall portion 210 which nest within four complementary slots 214 in the base of the stalk 212 when assembled. The slots are provided by with lead-in chamfers 215 to guide the slots into position when assembling. A fastening means is provided by circumscribing corrugations 216 on the stalk 212 and complementarily-placed inscribing corrugations 217 on the interior surface 247, the sets of opposing corrugations interlocking when the pivot 204 is pressed into the cylindrical wall portion 210 causing the sets to bypass.

The flat support encircling wall portion 209 supports two rounded ledges 225 and a pointed ledge 226, all of which extend inwardly with clearance underneath. The pointed ledge, positioned adjacent to the aperture 208, provides a means for indicating the position of the aperture during and after the loading of the circular tablet package 205. The encircling wall portion 209 also supports a holding lug 227 attached to a slotted portion (not shown) of the wall which snaps over the tablet package 205 during loading in order to retain it thereafter. The holding lug 227 has a ledge portion 228, best shown in FIG. 9, serving the function of holding the tablet package in place on the flat support, and an inclined plane portion (not shown) providing a means for levering the structure aside during loading. The outside surface of the encircling wall portion 209 contains a latch recess 229, positioned at a point diametrically opposite the hinge 206, which works in cooperation with a latch lug 230 in the cover, best shown in FIG. 9, to provide a latching means when the tablet dispenser is closed.

Figure 11:
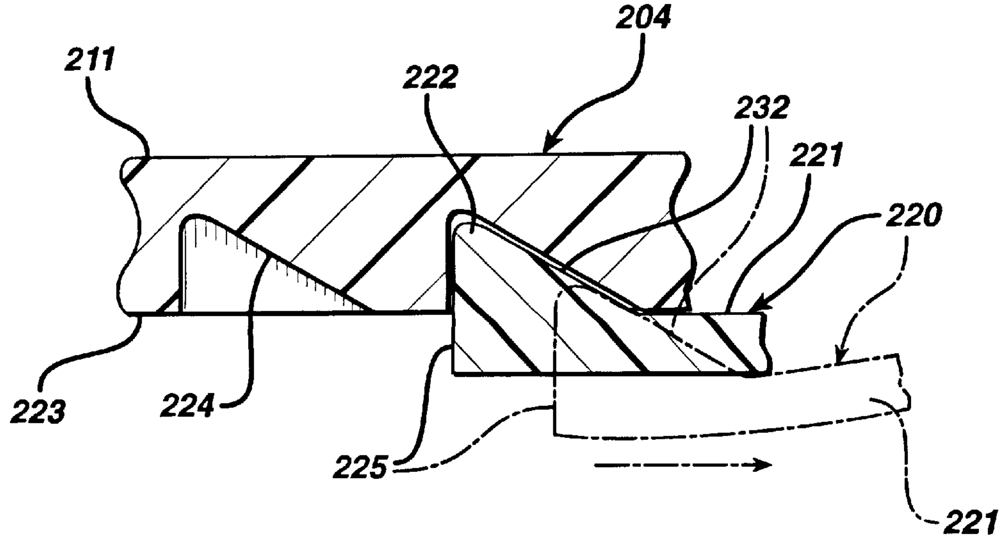

The rotatable knob 203 has a top surface 248 supported by an exterior cylindrical wall 249 and has a central bore 218. The central bore is of sufficient dimension to surround the pivot stalk 212 when the pivot flat top surface 211 is nested within recess 246 which is bounded by an interior cylindrical wall 219 extending downward from the inside diameter of the top surface 216. Extending inward from the bottom edge of the interior cylindrical wall, defining the floor of the recess 246, are four spring pawls 220. The spring pawls comprise four accurately-arrayed spring arms 221 which terminate in four ratchet pawls 222 which, in turn, provide a cantilevered upward bias by the spring arms from base points lying on a common circle corresponding to the ratchet tract 224 (see FIG. 10). When the pivot 204 is seated in the cylindrical wall portion 210 of the flat support 201 passing through the central bore 218 of the rotatable knob 203, thereby providing connecting means with the flat support, the ratchet pawls 222 close with the ratchet track 224, thereby forming a means for intermittent unidirectional advancement of the rotatable knob. The pawls and track have a rest position, as best shown in FIG. 11, defining a ratchet stop. The sliding face 232 of the pawl provides for clockwise advancement of the rotatable knob 203 and the abutting face 223 limits counterclockwise motion. The number of ratchet stops corresponds to the number of tablets 207 in the regimen. The ratchet stops are in fixed alignment with the flat support 201 and, in particular, with the dispensing aperture 208, by means of the radial vanes 213. The interposition of components is best shown in the cut-away view of FIG. 9.

A notched skirt 231 extends outward from the bottom edge of the exterior cylindrical wall 249. The notches also correspond to the number of tablets 207 of the tablet package 205 and are in registry, linked by the spring pawls 220, with the stops on the ratchet track 224 (FIG. 10) and, associatively, with the dispensing aperture 208. Indicators of periodicity 251, such as days of the week, are printed or engraved onto the top of the flat surface 248 of the rotatable knob 203, also in registry with the ratchet track stops. An indicator mark 233 is similarly printed or engraved onto the flat surface 211 of the pivot 204 in fixed registry with the dispensing aperture 208, providing, in cooperation with the indicators of periodicity, a means for indicating by name (e.g. day of week) the ratchet position corresponding to the aperture. Knurls 234 are formed into the top outside edge of the rotatable knob 203 thereby providing a means for gripping when torque is applied to the knob by hand.

The circular tablet package 205 comprises a tablet housing 235 and a rigid skeletal structure 236. The tablet housing contains the tablets 207 between a layer of flexible material having collapsible tablet pockets 237, such as thermoformed PVC film, and a frangible lid, such as aluminum foil, sealed underneath. The tablet housing 235 is shaped like a donut and is perforated with two pilot holes 238 adjacent the inside diameter. During assembly, the pilot holes are threaded over posts 239 attached to lugs 240 on the rigid skeletal structure 236. The posts are then headed over in rivet fashion thereby unitizing the rigid skeletal structure with the tablet housing 235 to form the complete tablet package 205. After use, the spent tablet housing can be stripped from the rigid skeletal structure for the purpose of recycling materials by pulling the tablet housing away from the rigid skeletal structure thus rupturing the connecting structure of the lugs 240 at the fragile necks 241, which are otherwise robust when remaining combined with the tablet housing 235. The rigid skeletal structure 236 has apertures 242 of a number corresponding to the number of tablets, and arrayed so as to fall beneath each of the collapsible tablet pockets 237 of the tablet housing 235 when oriented thereto by the pilot holes 238. A tablet 207 is dispensed by applying finger pressure to a collapsible tablet pocket thereby urging the tablet 207 through the frangible film and the supporting aperture.

The circular tablet package 205 is provided with two rounded cut-aways 243 and a pointed cut-away 244 complementary in size, shape, and layout, respectively, to the rounded ledges 225 and the pointed ledge 226 appended to the flat support 201. The pointed cut-away 244 corresponds to a designated first tablet of the regimen. The cut-aways 243 and 244, in cooperation with the ledges 225 and 226, permit loading of the circular tablet package 205 into the tablet dispenser 200 in only one initial orientation thereby furnishing a designated first tablet at the dispensing aperture 208 for initial dispensing. A connecting means is provided by the lugs 240 of the rigid skeletal structure 236 which are complementarily shaped to interlock with the notched skirt 231 of the rotatable knob 203. Upon advancement of the next tablet to the aperture 208 by rotation of the rotatable knob, the periphery rail 245 of the rigid skeletal structure 236 underpasses the ledges 225 and 226 by traversing the clearance underneath thereby locking the circular tablet package 205 within the tablet dispenser 200. Because the layout or geometry of the cut-aways and ledges permits a match at only the loading position, the locking arrangement is maintained until the advancement completes a circle back to the initial position. The circular tablet package 205 can then be removed, and the tablet dispenser 200 can be refilled with a fresh tablet load via a new tablet package.

Figure 12:
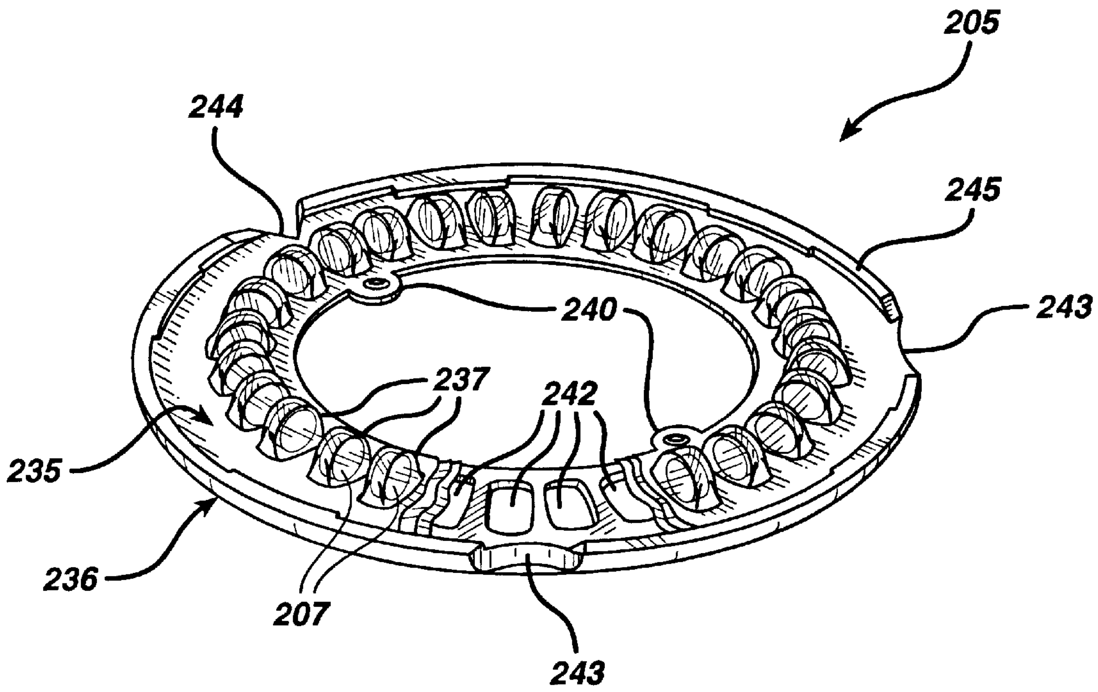
FIG. 12 is a perspective view of the tablet package (refill unit) which is adapted for insertion into the pill dispenser of the invention with a cut away view of the blister ring to show the tablet package platform.

FIG. 12 is a perspective view of the tablet package (refill unit) which is adapted for insertion into the pill dispenser of the invention with a cut away view of the blister ring to show the tablet package platform.

Figure 13:
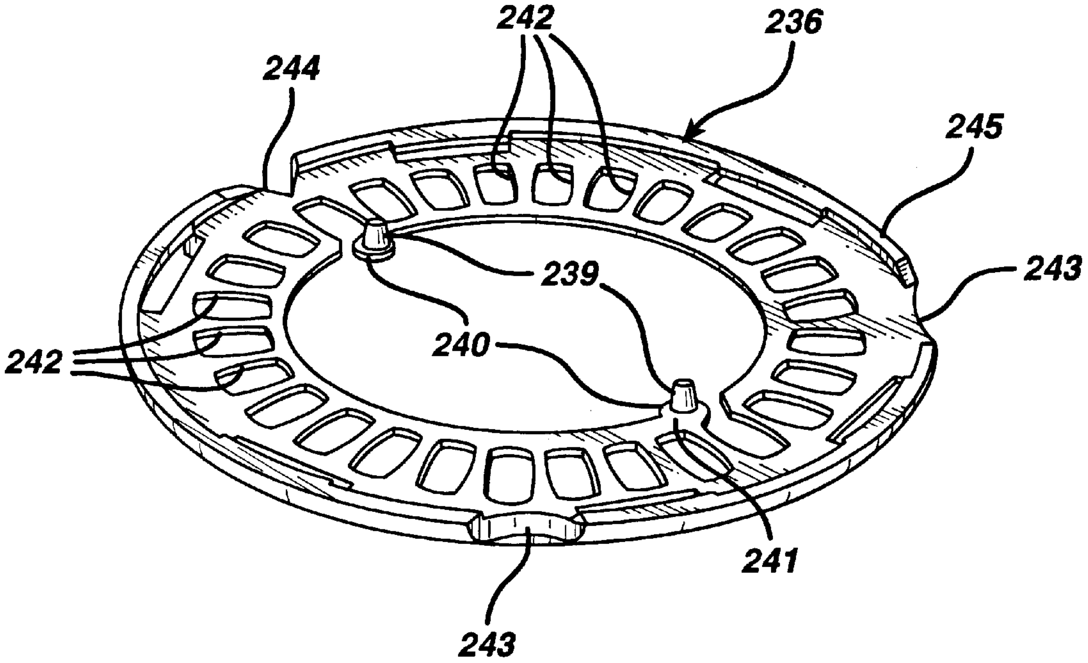
FIG. 13 is a perspective view of a tablet package platform upon which a blister ring containing tablets may be mounted.
Figure 14:
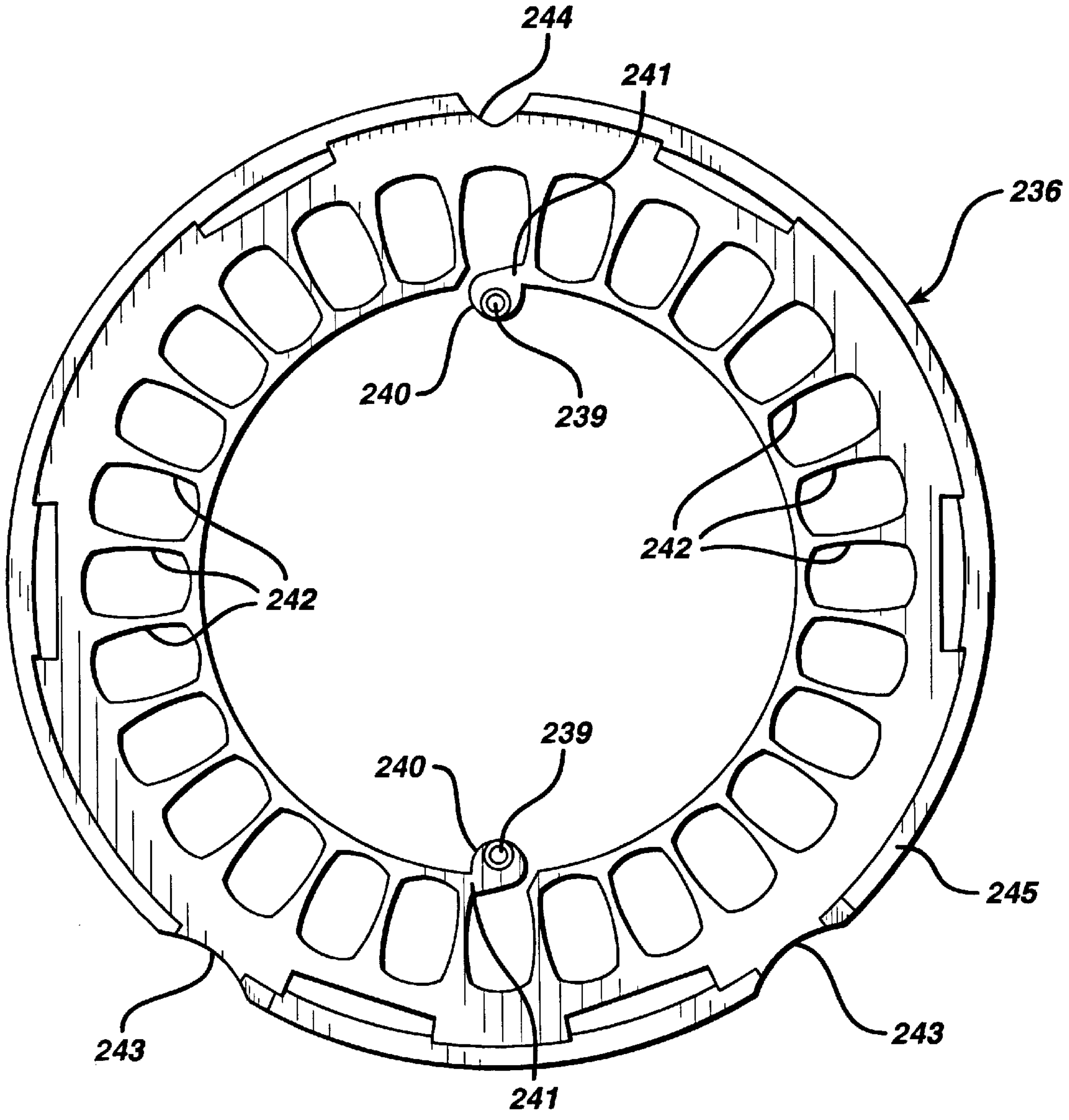
FIG. 14 is a top plan view of the tablet package platform.

FIGS. 13 and 14 are perspective views of a tablet package platform upon which a blister ring containing tablets may be mounted. The substantially circular platform comprises a rigid skeletal structure 236 having posts 239 on the inside diameter which are attached to lugs 240. The lugs 240 are connected to the rigid skeletal structure 236 by means of fragile necks 241. The rigid skeletal structure 236 has apertures 242 for passage of tablets and cutaways or notches 243 and 244 which are adapted to correspond to ledges in the tablet dispenser for positive and correct placement of the tablet package into the tablet dispenser system.

While the material for the elements of the tablet dispenser are generally left to choice and compatibility with the functions of the dispenser, the rotatable knob, the center axis means, the support base, rigid platform and cover are preferably made of plastic. Plastic materials such as general purpose polystyrene are conveniently injection molded into the desired configurations, while providing sufficient rigidity and durability for continual, frequent and repeated use of the dispenser. The cover, base, and calendar components may be injection molded in high impact polystyrene (HIPS).

The days of the week are imprinted onto the top calendar surface, and the indicator mark 15 is similarly highlighted by imprinting. The method of imprinting is either by hot stamping or by pad printing. These three components may be preassembled and supplied as a unit. As alluded to briefly above, the tablet package blister pack 19 has collapsible pockets made from plastic, and inasmuch as they contain the tablets, it is preferable that the dispenser be sufficiently compact to fit in the palm of the user's hand. Typically, the diameter of the circular platform which has twenty-eight (28) openings therein is about 3.0 inches (7.6 cm.), while the support is slightly larger.

The refill composite consists of a platform injection-molded in medium impact polystyrene (MIPS) and a blister unit containing the pills. The platform and blister are bonded together in a fixed orientation. The blister may comprise polyvinyl chloride (PVC) film which is thermoformed into cavities to receive the tablets or pills before laminating the aluminum foil lid, and subsequently die-cutting the laminate from the web, according to well-known manufacturing processes.

Thus there has been provided a tablet dispenser for dispensing tablets or similar solid-form pharmaceutical preparations according to a time related regimen whereby the user thereof is plainly informed when the tablet should be taken thereby eliminating the uncertainty and confusion which may often accompany the taking of such pharmaceutical preparations and following of prescribed dosage regimens.

The scope of the present invention is not limited by the description, examples and suggested uses herein and modifications can be made without departing from the intended scope and spirit of the invention. For example, other components may be added to the dispenser including additional locking mechanisms for making the package more child or tamper resistant or additional aesthetic features including embossing or coloring of the package. The dispenser may also be easily adapted to different languages or days of periodicity of dosage by application of an adhesive label over the dated knob. The dispenser may be further adopted for twice daily pharmaceutical regimens by providing a.m. or p.m. markings in addition to the days of the week. Further, the ledges on the tablet dispenser base and notches on the tablet package may be interchanged by providing an extended cavity in the base to accept a notched tablet package therein. The present invention may also be used to provide a dispenser for vitamins, minerals or other nutrients.

Figure 15:
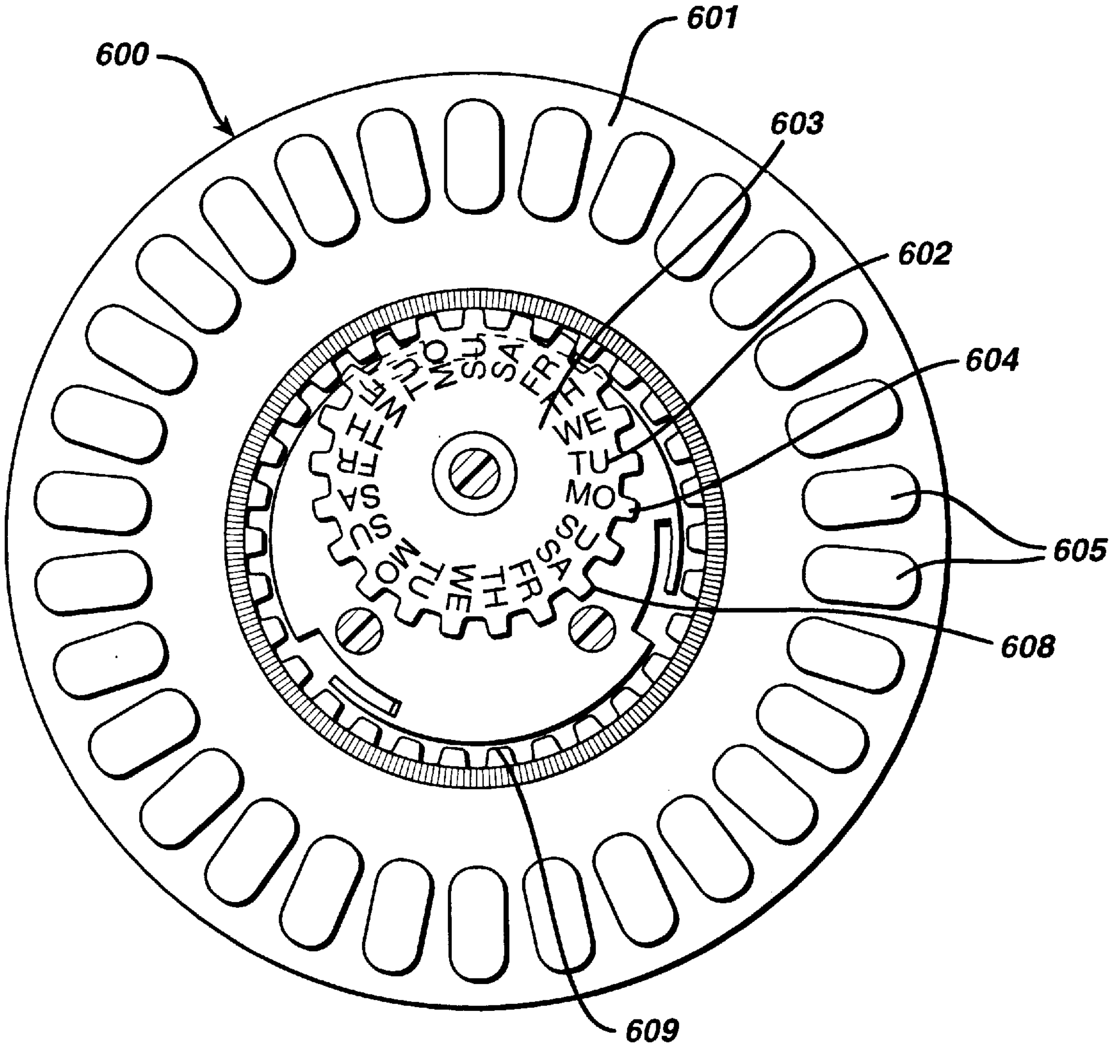
FIGS. 15–17 are plan views of an additional embodiment of the present invention.
Figure 16:
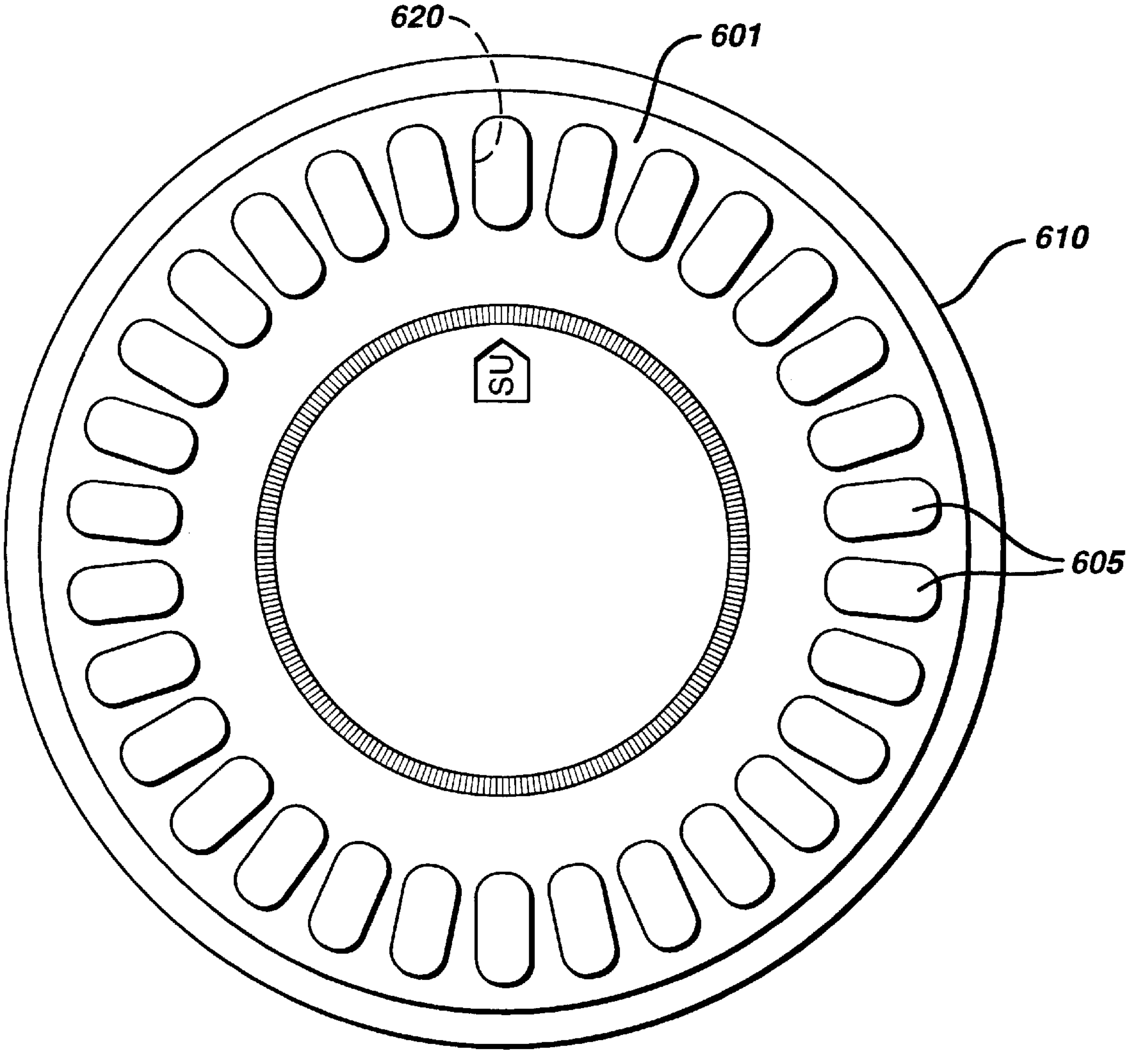
Figure 17:
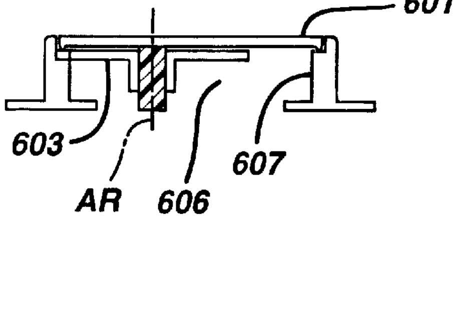

An additional embodiment is described in FIGS. 15–17 herein. To understand this embodiment, one must realize that the day indicia (MON, TUE, etc.) are imprinted on the rotating mechanism so that there is a one-to-one correspondence of tablet positions and days. Since the rotating mechanism may have one of several orientations to the refill, it becomes essential that the regimen (and the number of corresponding days) be an whole number multiple of seven. If this were not the case, a discontinuity would exist in the circle of days which could be positioned between two sequential tablets intended for two sequential days.

When dealing with a chronic regimen, i.e., not typically contraceptives, which is more considered a directly attributable dosage to cycles in a count which is not divisible by seven, it is particularly useful to have a variable start day mechanism because each cycle of the regimen will begin on a day different than the previous cycle. The present invention provides such a mechanism for regimens which are not seven-multiples while preserving all benefits of the systems described above.

In the present working system 600, the regimen is daily doses for 30 days. The principle of the variable start day mechanism is that the rotating member 601 of the dispenser drives a wheel 602 interior to the rotating member 601, such wheel 602 having a top surface 603 on which days-of-the-week are arrayed with a direct regularity. Rotating member 601 has a mounting retainer (RM) which engages driving mechanism 604. The circumference of the wheel 602 is defined by the circumference of the driving mechanism 604 such the ratio of the respective circumferences of members 601, 602 is some multiple of seven (less than 30) divided by 30. Each index of the rotating mechanism advances the driving mechanism 1/30th of a circle while advancing the wheel 1/7th (or 1/14th, or 1/21st, or 1/28th) of a circle. In this manner, continuous indexing advances the dosages one day-at-a-time continuously and transparently to the user.

In this embodiment, the tablets 605 are arrayed in a circle, the circumference of which defines an interior space 606. A cylindrical wall 607 is positioned in the interior space 606 with an axis of rotation AR at the center of the circle. The inside surface of the cylindrical wall 607 is formed with 30 gear teeth 608. In this particular embodiment, the wheel has 21 peripheral gear teeth sized to mesh with the gear teeth 609 on the cylindrical wall 607. The axis of rotation AR of the wheel is positioned on a line connecting the aperture and the axis of the cylindrical wall such that the two sets of teeth are interlocked. Twenty-one days-of-the-week are arrayed on the top surface of the wheel such that one day is always in alignment with the tablet 605 positioned at the aperture 620. A stationary cover 610 is fitted over the wheel which hides the bore of the cylindrical wall 607 and which has a window through which to view the day marking in alignment with the aperture 620.

Tablets are dispensed through an aperture in the base, as disclosed in the earlier embodiments described herein. As can be seen from the figures, the gearing mechanisms 604, 609 mating the base support and the tablet package 600 respectively, can be formed from conventional plastics. The gears can be made to mesh with one another. Importantly, as described above the gears 609 which form part of the tablet package can be made in multiple variations so as to accommodate different regimens of medical dosages.

As illustrated above, application of the dispenser of the present invention for medical and pharmaceutical uses can be accomplished by any clinical, medical and pharmaceutical methods and techniques as are presently and prospectively known to those skilled in the art. Thus it is intended that the present invention cover the modifications and variations of this invention provided that they come within the scope of the appended claims and their equivalents.

What is claimed is:

1. A tablet dispenser component system comprising:

a circular tablet package comprising a plurality of sequentially arranged collapsible tablet pockets each containing a tablet arranged substantially circularly about the package;

a base support comprising a single tablet dispenser aperture therein and oriented to receive the tablet package in only one position of positive engagement thereon whereby a designated tablet of the tablet package is provided over the single tablet dispensing aperture;

each of said tablet package and base support having gears associated therewith, said gears on said package mateable with said gears on said base support;

means for rotating the circular tablet package about the base support around a center axis portion of the base support to locate tablets in the sequentially arranged tablet pockets of the tablet package over the tablet dispensing aperture for dispensing therefrom; and means for adapting said package to said base support so that any number of dosages in said package which are a whole number multiple of a predetermined plurality of days may be engaged with said base support;

each of said tablet package and base support having gears associated therewith, said gears on said package mateable with said gears on said base support; and wherein said means for adapting comprising providing said gears associated with said base support capable of accepting said base support capable of accepting a multiple configuration of gears on said tablet package, so as to represent multiple regimens of medication.

2. A tablet dispenser system for dispensing tablets in a designated sequence comprising:

as a first element, a flat support having a single tablet dispensing aperture therein;

as a second element, a pivot connected to the center of the flat support defining an axis;

as a third element a rotatable knob with a means for ratcheting to permit rotation about said pivot, and a bore, sized for encircling the pivot, and containing a means for intermittent unidirectional advancement of the knob about the axis with registry with the aperture;

as a fourth element, means for indicating engageable with said means for ratcheting such that any variable number of indicators can be advanced in correspondence to any number of a plurality of tablets comprising a dosage regimen, said number of tablets being a whole number multiple of said number of indicators;

as a fifth element, a circular tablet package comprising a housing containing the tablets in a plurality of frangible dispensers arranged circularly about the package at a radial distance corresponding to the distance of the aperture from the axis and having a central bore sized for encircling the rotatable knob;

each of said tablet package and base support having gears associated therewith, said gears on said package mateable with said gears on said base support; and wherein said means for adapting comprising providing said gears associated with said base support capable of accepting said base support capable of accepting a multiple configuration of gears on said tablet package, so as to represent multiple regimens of medication.

3. The tablet dispenser system of claim 2 wherein the tablet package after use is removed and replenished with a fresh tablet package providing thereby for a reusable dispenser, extendible in use through multiple refill replenishments.

4. The tablet dispenser of claim 2 wherein the frangible dispensers are formed to accommodate various shapes and sizes of tablets postured either on a surface of the tablet or on the edge of the tablet.

5. The tablet dispenser of claim 2 further comprising indicators of periodicity corresponding to the days of the week.

6. An intuitive tablet dispenser kit for dispensing a regimen of dosage preparations in a designated sequence comprising:

as a first element, a container;

as a second element, a refill carrier housing the solid dosage preparations in a circular array loaded into the container, the refill carrier presented separately upon introduction to emphasize a refillable feature;

as a third element, a means for individually dispensing the dosage preparations from the refill carrier; and as a fourth element, a ratcheting mechanism encircled by and engageable with said second element so as to deliver said dosage preparations, said fourth element independent in its number of ratchet positions to the number of dosage preparations in said second element;

each of said tablet package and base support having gears associated therewith, said gears on said package mateable with said gears on said base support; and wherein said means for adapting comprising providing said gears associated with said base support capable of accepting said base support capable of accepting multiple configuration of gears on said tablet package, so as to represent multiple regimens of medication.

7. The tablet dispenser kit of claim 6 further comprising literature or labeling for informing and instructing the patient, the physician or the pharmacist as to the use of the tablet dispenser kit.

8. The tablet dispenser kit of claim 6 wherein a plurality of refill carriers are provided.

* * * * *